United States Patent Office

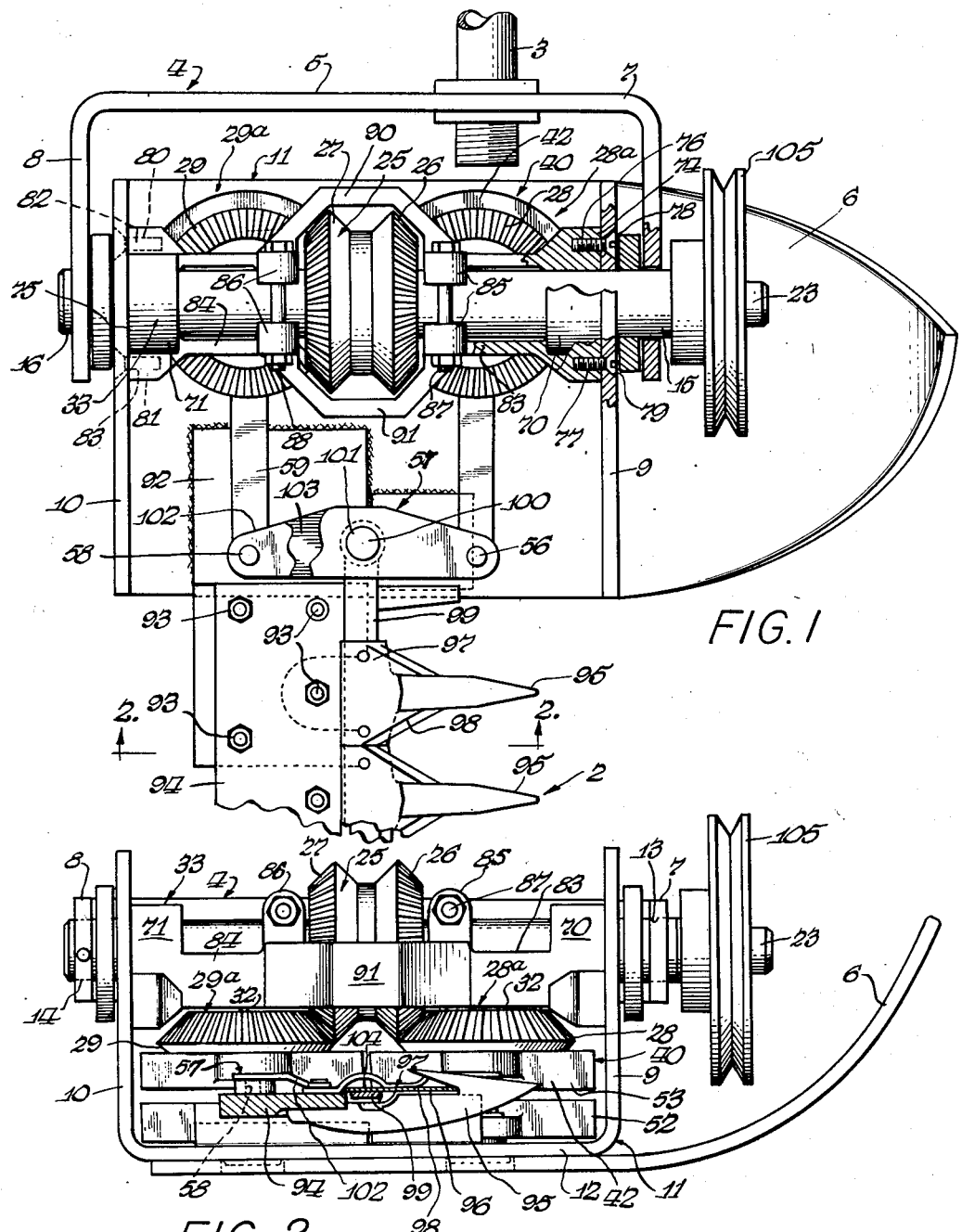

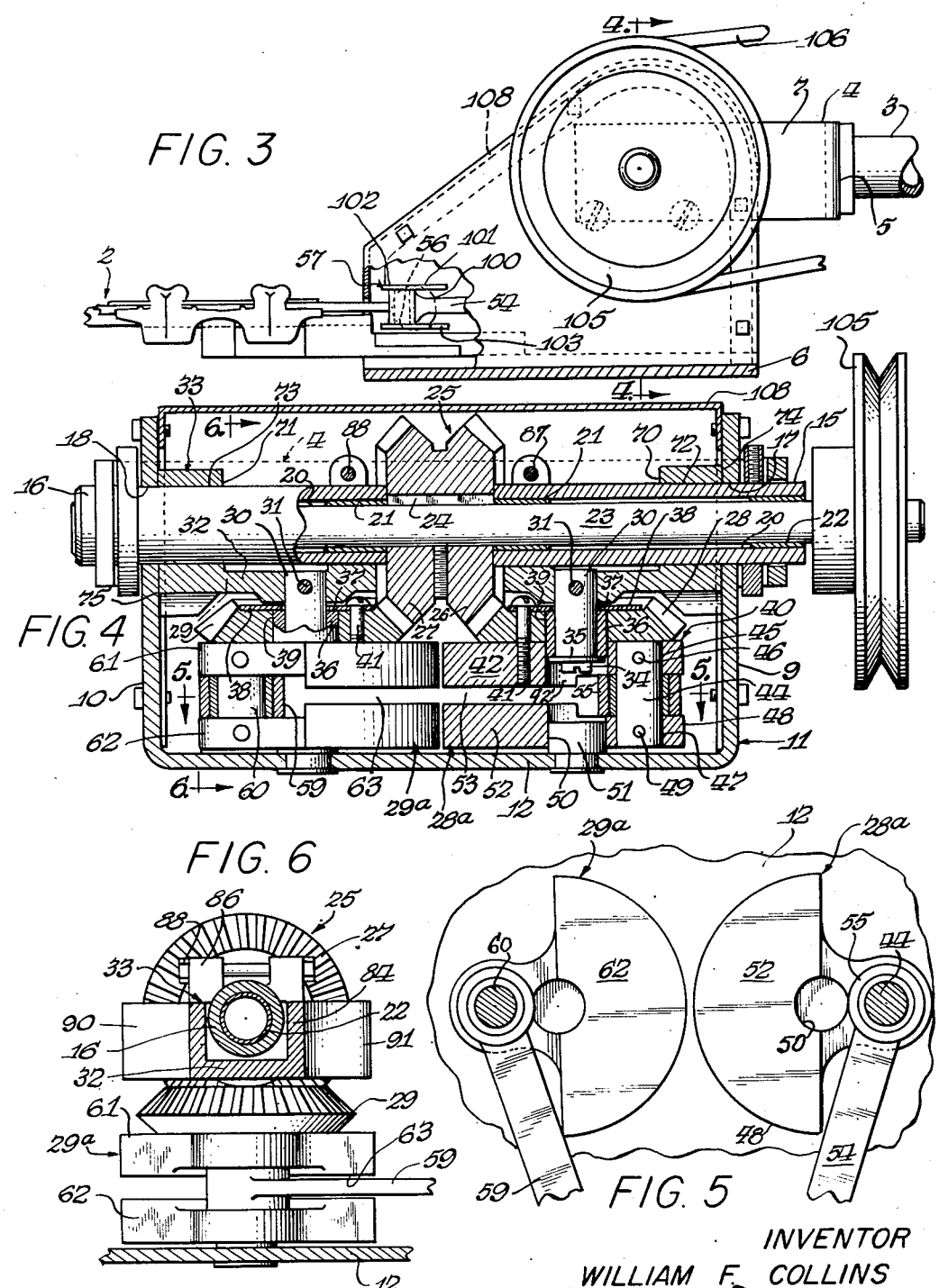

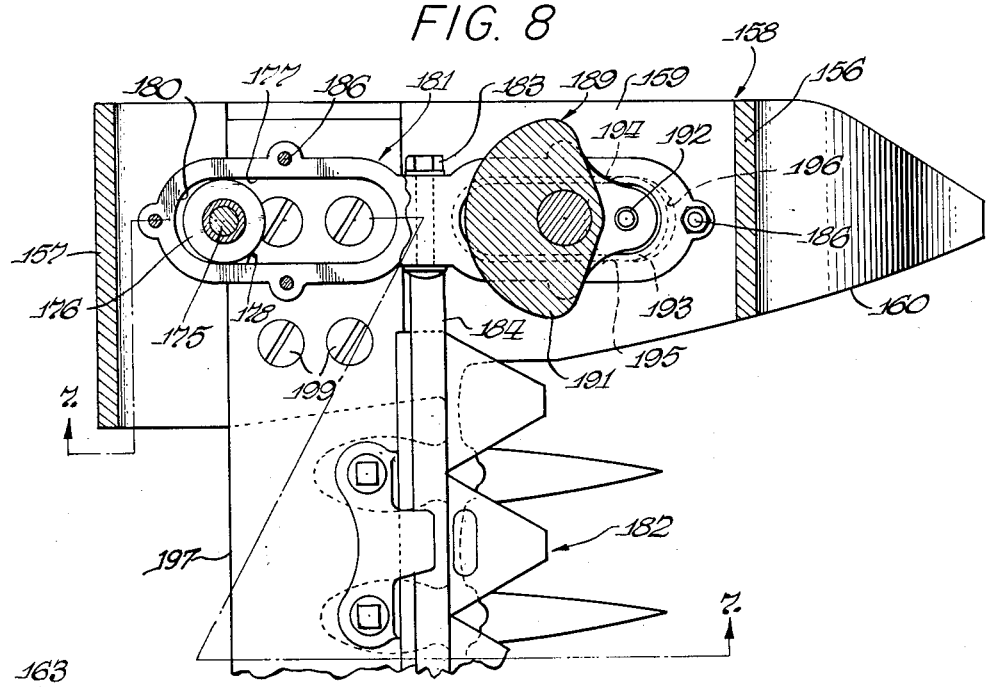
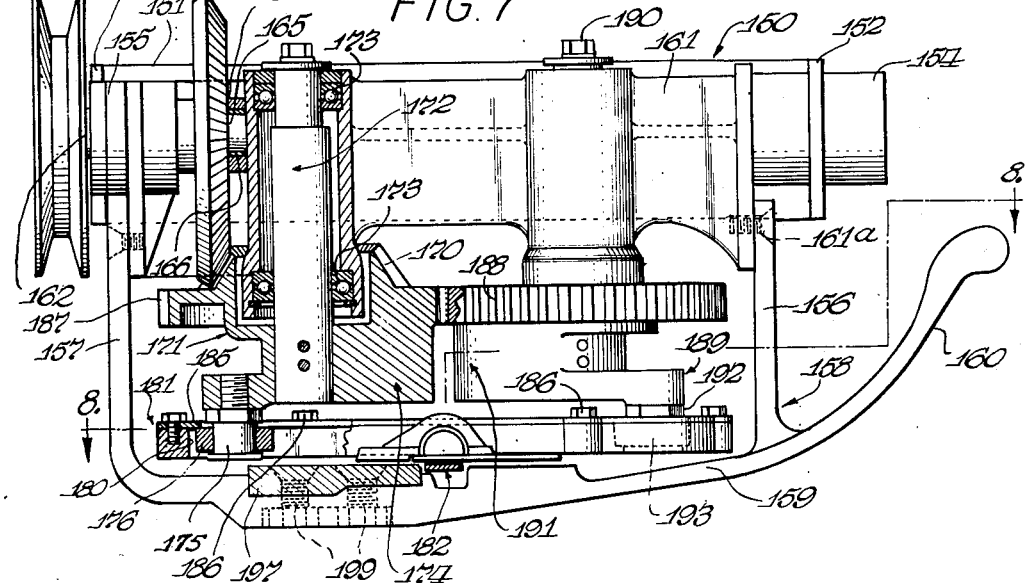

2,790,295
Patented Apr. 30, 1957

2,790,295

RECIPROCATING SICKLE ASSEMBLY WITH COUNTERBALANCED DRIVE MEANS

William F. Collins, Downers Grove, Ill., assignor to International Harvester Company, a corporation of New Jersey Application September 28, 1954, Serial No. 458,818

10 Claims. (Cl. 56—296)

This invention relates to mowers, and more specifically, to a mower wherein a novel counterbalancing drive mechanism is associated with the reciprocating mower sickle for eliminating destructive vibrations.

Through many years of experience it has been established that the most efficient and simplest mower construction is of the type incorporating a stationary finger, or cutter, bar which carries a reciprocating knife. This type of construction has served exceedingly well; however, a tendency at the present time, in view of the high costs of operation and lack of manpower, is to increase the speed of the mowers so as to permit an increase in the traversing speed of the mower. The present mower constructions have been driven to the limit of their capacity and the speeds demanded are incapable of attainment in current constructions.

Furthermore, current emphasis is upon reducing weight of the implement to conserve power, lower cost, and simplify the construction. The high-frequency vibrations heretofore limited this objective because they are extremely destructive, and the only practical solution appeared to be to strengthen the structure and increase its mass to absorb the shock.

A general object of the invention is to provide a simplified mower construction incorporating a novel balanced drive mechanism which is carried and wholly housed within the inner shoe of the mower.

A more specific object of the invention is to provide a mower wherein the drive mechanism incorporates a pair of counter-rotating members with balancing weights so arranged as to operate substantially in the plane of the reciprocating knife and which substantially cancel out each other during each cycle, except at the end strokes of the mower sickle whereat they additively counterbalance the inertia of the sickle.

A still further object of the invention is to provide a drive mechanism of simple form which may be housed within the inner shoe of the mower, and which may be so arranged as not to interfere with the lifting and lowering of the mower or cutting in an upright position.

These and other objects of the invention will become more apparent from the specification and the drawings, wherein:

Figure 1 is a fragmentary plan view of a mower incorporating one form of the novel drive mechanism within the inner shoe structure;

Figure 2 is a transverse vertical sectional view taken substantially on the line 2—2 of Figure 1;

Figure 3 is a fragmentary front-elevational view of the mower assembly with portions broken away;

Figure 4 is a longitudinal vertical sectional view taken substantially on the line 4—4 of Figure 3;

Figure 5 is a fragmentary horizontal sectional view taken substantially on line 5—5 of Figure 4;

Figure 6 is a transverse vertical sectional view taken approximately on line 6—6 of Figure 4; and Figures 7 and 8 illustrate a modification of the invention, Figure 7 being a vertical sectional view taken substantially on the planes indicated by the line 7—7 of Figure 8, and Figure 8 being a horizontal sectional view taken substantially on the lines 8—8 of Figure 7.

Describing the invention in detail, the harvesting mechanism is of the type shown in U. S. Patent No. 2,616,234 and includes a mower, generally designated 2, which comprises the usual support or coupling arm 3 connected to a yoke, or carrier, 4 at the back plate 5 thereof, said plate paralleling the inner edge of the inner shoe 6 of the mower and at opposite ends having outwardly projecting ear, or lug, members 7 and 8 which flank front and rear upright walls 9 and 10 of a housing 11 fastened on the inner shoe, the housing 11 including a flat-bottom plate, or base, 12 which seats atop the shoe 6 and is connected thereto preferably as by welding. The ears 7 and 8 are provided to journal at 13 and 14, respectively, on coaxial bearing members 15 and 16 which extend generally horizontally through apertures 17 and 18 extending transversely in the parallel walls 9 and 10 of the mower drive housing 11. It will be observed that these journals at 13 and 14 together with the bearing structures 15 and 16 accommodate pivotal movement about a generally horizontal axis of the entire mower assembly 2, as is conventional practice.

The bearing members 15 and 16 are of generally cylindrical construction, and each mounts adjacent to each end within a bore 20 thereof a pair of bearing inserts 21 and 22 which journal a driveshaft, or rotary part, 23 which is disposed on an axis transverse to the line of reciprocation of the sickle, said driveshaft intermediate its ends, that is between the inner ends of the bearing members 15 and 16, being keyed at 24 to a double-crown bevel gear or pinion 25 which rotates on a generally horizontal axis, the gear 25 being constituted of a pair of mitre or bevel gears 26 and 27 which extend below the shaft 23 between a pair of companion mitre or bevel gears 28 and 29 of a pair of means, generally indicated 28a and 29a for converting rotary motion to reciprocating motion and disposed in a substantially horizontal plane in the normal cutting position of a mower, the gear 28 meshing with the gear portion 26 and the gear 29 meshing with the gear portion 27.

Inasmuch as the mounting of the gears 28 and 29 are the same, a description of the mounting of gear 28 is believed sufficient and the same reference numeral to common parts will apply. As best seen in Figure 4, each gear 28 and 29 is spindled on a stationary stubshaft 30 which at its upper end is connected, as by a pin 31, to the bottom wall portion 32 of a skeletal support member, generally designated 33, which constitutes the main support for the shaft 23 as well as the entire gear structure from the housing. The stubshaft 30 is provided at its lower end with a cap screw 34 which supports a washer 35 which in turn seats the lower end of a bearing member 36 which is sleeved about the stubshaft 30. The upper end of the cylindrical bearing 36 seats, as at 37, against the underside of a hold-down plate 38, and peripherally provides a cylindrical bearing surface, as at 39, for the related bevel gear 28 or 29, the plate 38 seating on top of the bevel gear 28 or 29 and being connected thereto and to the related counterweight structure, as by bolts 41. The counterweight structure, or assembly, 40 associated with gear 28 is provided with a bore 42' which admits the lower end of the bearing 36 and in complementary engagement therewith and the member 40 is provided with a substantially semi-cylindrical counterweight portion 42 and diametrically opposite to the counterweight portion 42, the member 40 is provided with a crankpin 44 which at its upper end is socketed, as at 45, in the member 40 and pinned thereto, as by pin 46, the member 44 extending at its lower end into a socket 47 within a plate member 48 and pinned thereto, as by pin 49, the member 48 having a central bore 50 which may be bushed and which admits an upstanding stubshaft 51, the lower end of which is connected to the bottom plate 12 of the gear casing or carrier. The member 48 is provided at its side, diametrically opposite the crankpin 44, with a counterweight 52 which is in axial alignment with the companion counterweight 42 and vertically spaced therefrom to provide an accommodation space 53 for a front connecting rod, or pitman, 54 which has one end 55 journalled on the crankpin or throw 44 and the other end journalled by means of a pin 56 to an adjacent front end of a cross-head member 57, said yoke member 57 having its opposite or rear end pivoted on an axis parallel to the pivot 56, as at 58, to the outer end of a rear connecting rod 59, the inner end of the rod 59 being pivoted on the crankpin or throw 60 which extends between the upper and lower counterweight members 61 and 62 which are connected to the gear member 29 in the same manner as the gear 28 is connected to its counterweight members. It will be observed from a consideration of Figures 4 and 6 that the members 61 and 62 are vertically spaced to provide an accommodation space 63 to pass the arm or pitman 59 therebetween. It will be understood that the counterweights 61, 62 and 42, 52 are spaced 180° apart or oppose each other at the midstroke of the sickle, as in Figures 5 and 2, and are opposite the stroke of the sickle at each end of its stroke, as in Figure 1, in order to additively counterbalance the dynamic inertia of the knife at each end of its stroke.

Referring now to the specific detailed construction of the support 33, it is an elongated member and extends lengthwise between the walls 9 and 10 of the housing structure and is provided at opposite ends with hub portions 70 and 71 with aligned bores 72 and 73, respectively, admitting the bearing sleeves 15 and 16, respectively, and the remote ends of the members 70 and 71 have flat-face bearing, as at 74 and 75, with the internal sides of the walls 9 and 10. It will be seen that the hub portion 70 is provided with a plurality of axial bores 76 and 77 into which are threaded bolts 78 and 79, the heads of which are countersunk in the wall 9, as best seen in Figure 1, said bolts 78 and 79 providing a securement between the member 33 and the wall 9. Similarly, the hub portion 71 is provided with threaded bores 80 and 81 into which are threaded bolts 82 and 83, the heads of which are countersunk in the wall 10 and the bolts serving as a securement between the member 33 and the wall 10. The hub members 70 and 71 are continued inwardly into trough-shaped portions 83 and 84 which cup the adjacent portion of the bearings 15 and 16, respectively, and the inner ends of the trough-shaped portions are terminated at opposite sides of the double-crown pinion gear 25 and thereat are provided with upstanding ear lugs 85 and 86, respectively, the ear lugs extending above the bearing holders 15 and 16 and provided with aligned apertured receiving locking bolts 87 and 88, respectively, for clamping the bearings 15 and 16 against rotation. As heretofore indicated, the bottom wall portions 32 of the member 33 provide support for the stubshafts for the mitre gears 28 and 29, as best seen in Figure 4. The portions 83 and 84 are joined by connector webs 90 and 91 which extend around the intermediate portions of the pinion gear 25.

The bottom wall of the gear case is provided with a mounting or connecting plate 92 which is welded thereto, said plate extending outwardly from the housing and being connected, as by bolts 93, 93, to the inner end portion of a conventional mower bar 94 which carries the usual guide fingers 95 with ledger plates 96 on which is guided a knife, or sickle, 97 in the usual manner, the knife being provided with shearing blades 98 and the knife back 99 extending inwardly of the mower and at its inner end being provided with a ball 100 which is entered into a socket 101 formed by circular apertures in the upper and lower members 102 and 103 of the yoke or cross-head 57. The ball and socket afford a pivotal connection between the cross-head and the sickle. It will be understood that the knife is retained in its shearing relationship with the ledger plates by means of the conventional knife clips 104, as best seen in Figure 2.

The driveshaft 23 is keyed to a pulley 105 which is driven by a belt 106 which is connected to the power take-off shaft of an associated tractor as by the mechanism shown in U. S. Patent No. 2,616,234. The entire mechanism is enclosed by a cover 108 which bolts to the side walls 9 and 10 of the housing.

Referring now to Figures 7 and 8, the support 150 is the same as the bail or yoke 4 of the previous embodiment, and has a transverse portion 151 with lugs 152, 153 which pivot respectively on bearings 154, 155 which are carried by the upright walls 156, 157 of the housing, or carrier, 158.

The housing 158 incorporates a base member 159, in the present instance integrated with the inner shoe 160.

The walls 156, 157 support a skeletal carrier framework 161 via bolts 161a connected to wall 156, and one end of carrier 161 and the other end of structure 161 is carried on the bearing structure 155 through a driven input shaft 162 which is journalled in the bearing 155 on an axis transverse to the line of reciprocation of the sickle, the shaft being keyed at its outer end to a sheave 163 which is driven by an associated belt (not shown), as in the previous modification. The inner end of the shaft, or rotary part, 162 is provided with a bevel gear 164 which is supported by the stub portion 165 of the shaft 162 journalled in a bearing 166 which is telescoped into a sleeve 168 on the adjacent end of the carrier framework 161.

The bevel gear 164 operates in a substantially vertical plane and meshes with a generally horizontally disposed bevel gear 170 formed integral with the eccentric means, or crank structure, 171 which is keyed to the lower end of a vertical support shaft 172, the shaft 172 being removably supported from the framework 161 at its upper end and journalled on bearings 173 carried by the frame structure.

The crank means 171 includes a counterweight 174 at one side of the axis of the shaft 172 and a crankpin, or throw, 175 at the opposite side of said axis, the pin carrying a roller 176 which is guided between the opposite edges 177, 178 of a slot 180 in the adjacent end of a drive-transmitting member, or scotch yoke, 181 which is disposed in the plane of the sickle 182 and connected intermediate its ends, as at 183, to the inner end of the sickle backing bar 184. The top of the member 181 is provided with a guide plate 185 bolted thereto, as at 186, for maintaining the roller in contact with the edge of the slot against which it is operating.

The crank assembly 171 incorporates a spur gear 187 which operates in a horizontal plane generally parallel to the plane of reciprocation of the sickle, and meshes with a companion spur gear 188 of a crank assembly, or rotary-driving means, 189 which operates on a vertical axis on a shaft assembly 190 identical with shaft 172 and similarly supported from the framework 161. The crank assembly includes a counterweight 191 at one side of its axis of rotation and a crankpin, or eccentric means, 192 at the opposite side of said axis, the wrist pin 192 mounting a roller 193 which operates between opposed edges 194, 195 of an elongated slot 196 in the adjacent end of the transverse element 181.

The knife or sickle is reciprocally supported by the mower bar 197 which is fixedly connected to the base portion of the housing as by bolts 199.

It will be noted that in each embodiment the rotary counter-rotating drive means are disposed at opposite sides of the center line of gravity and a reciprocation of the sickle and provide a balancing mass acting in a plane parallel, or substantially coplanar, to the plane of the sickle, and that the counterweights are so phased as to additively counterbalance the inertia forces of the sickle at each end of its stroke.

What is claimed is:

1. A mower having a support and a cutter bar including a sickle reciprocable thereon on a given line and in a given plane: sickle drive means, comprising a housing having base means thereon connected to the cutter bar; means including a pair of coaxially spaced bearings mounted on said housing on an axis above said base means and transverse to the line of reciprocation of said sickle; means pivotally connecting said housing to said support on said axis; a power input shaft extending through and journalled in said bearings and having an intermediate portion between said bearings, a double-crown pinion keyed to the input shaft and positioned substantially in radial alignment with said line of reciprocation of said sickle; a pair of crank means disposed respectively at opposite sides of said pinion and extending transversely of said axis between respective bearings and said base portion and journalled on said housing; gear means operatively associated with respective crank means and in meshing engagement with respective sides of said double-crown pinion for effecting rotation of said crank means in opposite directions; counterweights operatively associated with respective crank means and positioned to provide an effective inertia force substantially in said plane of operation of said sickle in counterbalancing relationship to the inertia forces thereof; and drive-transmitting means operative in said plane of operation of said sickle and operatively interconnecting the sickle with respective crank means, and drive transmitting means connected to said input shaft and formed and arranged to accommodate tilting of said mower about said axis while driving the same.

2. For a harvester having a support and a cutter bar including a sickle reciprocable thereon on a given line and having a cutting plane: sickle drive means, comprising a housing having means thereon for affixation to the cutter bar, said housing being hollow and comprising a pair of walls spaced fore and aft of said sickle; means mounted on said walls and including bearing means on an axis transverse to the line of reciprocation of the sickle; means for connecting said housing with said support coaxially with said bearing means; an input shaft journalled in said bearing means; first and second rotary power-transmitting members journalled on said third-mentioned means on generally parallel axes substantially normal to the axis of said shaft and disposed respectively fore and aft of said sickle, each of said members including eccentric means; means including a cross-head movably connected intermediate its ends to the sickle and a connecting rod interconnecting each end of the cross-head with the adjacent of said eccentric means and disposed substantially parallel and adjacent to the cutting plane of the latter; means for driving said members from said input shaft; and counterbalancing weights in driven relationship by said power-transmitting members and phased to obtain a counterbalancing effect on said sickle at each end of its stroke.

3. The invention according to claim 2, and said means for driving said members positioned therebetween and having direct driving engagement with both thereof.

4. The invention according to claim 2, and said cross-head comprising a pair of laterally spaced superposed elements respectively receiving said sickle and said connecting rods therebetween and said sickle and rods being substantially coplanar.

5. For a harvester having a support and a cutter bar including a sickle reciprocable thereon in a given cutting plane and on a given line: structure connected to the cutter bar and having upstanding fore and aft walls, and including a housing having means for affixation to said walls and having bearings arranged on an axis transverse to the line of reciprocation of the sickle and generally parallel to its cutting plane; means for connecting said structure to said support coaxially with said bearings externally of said walls; an input shaft extending through and journalled in said bearings; a bearing holder extending between said walls above said base means and connected to said walls and having end portions supporting said bearings; said bearing holder comprising an intermediate bifurcated section including a pair of laterally spaced outwardly bowed portions interconnecting the adjacent ends of said end portions; a double-crown gear having gear teeth on opposite sides keyed to said shaft and extending through said center section downwardly below said bearing holder; a crank positioned beneath each end portion of said holder and having an upper journal positioned adjacent to the related end portion of the holder and having a lower journal positioned adjacent to said base means of said housing; means mounting said upper journals of said crank means from respective end portions of said holder and said lower journals on said base means; a bevel gear keyed to each crank means and disposed in meshing engagement with the teeth on the adjacent side of said double-crown gear; each of said crank means having a throw portion substantially coplanar with said cutting plane of said sickle; said sickle having a longitudinal connecting portion located on a line extending between said crank means; a member extending crosswise of said connecting portion and connected thereto intermediate its ends; means operatively connecting said member to each of said crank portion; and counterweights connected to each of said crank means diametrically opposite the throw portion thereof.

6. The invention according to claim 5, and further characterized in that said counterweights are disposed above and below each throw portion immediately adjacent to said plane of said sickle to provide an effective counterbalancing force substantially in the plane of said sickle.

7. Sickle drive mechanism for a sickle reciprocal on a given cutter line and plane, comprising a carrier having means for the mounting thereof on an associated supporting structure; a power input shaft extending transversely to said line of reciprocation of the sickle and journalled on the carrier; a pair of counter-rotating crank members mounted on said carrier and oriented with their axes of rotation substantially normal to the plane of said sickle and spaced substantially equal distances at opposite sides of said given center line of reciprocation of said sickle; means drivingly interconnecting said crank members with said shaft; means operatively interconnecting said sickle with said crank means and comprising a cross-head pivoted intermediate its ends to said sickle and extending fore and aft of said sickle and terminating in end portions, and connecting rods interconnecting said crank means with respective end portions; and counterweight means connected to said members and oriented in planes generally parallel to said sickle and so proportioned and phased to obtain a force factor substantially counterbalancing inertia forces of said sickle at each end of its stroke, said means for mounting said carrier including pivot means coaxial with said power input shaft whereby said carrier may be pivoted without interrupting the transmission of drive thereto.

8. For a harvester having a support and a cutter bar including a sickle having a cutting plane and reciprocable on the bar on a given line: sickle drive mechanism, comprising a carrier, means for mounting the carrier at one end of the cutter bar; driving means including a rotary part journalled on the carrier on an axis transverse to the line of reciprocation of the sickle; a pair of rotary means for converting rotary motion to reciprocating motion positioned at opposite sides of said sickle and including cranks and having axes of rotation located in a plane substantially normal to the plane of said sickle and supported on the carrier and driven by said driving means; drive-transmitting means operatively interconnecting said pair of means with said sickle and including a cross-head connected intermediate its ends to said sickle and having forward and rear portions projecting respectively forwardly and rearwardly of said sickle, and a connecting rod pivoted to each crank and to the adjacent portion of the cross-head; and said pair of means each including a counterweight operating in planes substantially parallel to and delivering an effective force oriented substantially coplanar with said cutting plane of said sickle and phased to obtain a substantially balanced force couple therewith.

9. Drive mechanism for a sickle having a plane of cutting and reciprocal on a given cutter line, comprising a carrier; driving means including a rotary part journalled on the carrier on an axis transverse to the line of reciprocation of the sickle; a pair of means for converting rotary motion to reciprocating motion positioned at opposite sides of said sickle in a plane substantially normal to said cutting plane of said sickle and supported on the carrier and related in driven relationship to said driving means; reciprocating drive-transmitting means operatively interconnecting said pair of means with said sickle; and said pair of means each including a counterweight delivering an effective force oriented substantially parallel with said plane of cutting of the sickle and phased to obtain a substantially balanced force couple therewith; said carrier comprising a pair of upright walls; a cross-support connected between said walls; said rotary part comprising a shaft journalled in said cross-support; bevel gear means connected to said shaft; said pair of means disposed adjacent to said bevel gear means and each comprising a vertical shaft depending and rotatively mounted from said cross-support; a bevel gear connected to each vertical shaft and in meshing engagement with the adjacent bevel gear means; a counterweight connected to each bevel gear at one side of its axis of rotation; and a crank connected to each bevel gear diametrically opposite to the center of gravity of the related counterweight and connected to said drive-transmitting means.

10. For a harvester having a support and a cutter bar including a sickle reciprocable thereon on a given line and in a given plane: sickle drive means comprising a housing having means thereon for affixation to the cutter bar, said housing including spaced front and rear upright walls, a cross-structure extending lengthwise fore and aft and having opposite end portions connected to respective walls, bearings on the opposite end portions of said structure disposed on a fore and aft extending generally horizontal axis, an input shaft coaxial with said bearing means journaled thereon and having one end projecting outwardly of said housing, a power transmitting belt pulley connected to said one end of the shaft, a yoke structure forming part of said support and including a pair of spaced apart portions pivotally mounted on respective bearings, a pair of bevel gears connected to said shaft and spaced axially thereof and constrained for rotation therewith, means including a pair of front and rear cranks and bevel gears connected thereto mounted on said cross-structure in meshing engagement with respective first-mentioned bevel gears for rotation on substantially vertical axes disposed at opposite sides of said line of reciprocation of the sickle in a plane extending substantially normal thereto, a cross-head connected intermediate its ends to one end of said sickle and having front and rear ends disposed respectively forwardly and rearwardly of said sickle and in substantially transverse alignment with respective of said axes, each crank having a throw, a connecting rod connecting the throw of the rear crank with said rear end of the cross-head, another connecting rod connecting the throw of said front crank with said front portion of the cross-head, and a counterweight connected to each crank opposite the throw thereof and operating in a plane parallel to the plane of reciprocation of the sickle, said bevel gears formed and arranged to rotate said cranks in opposite directions.

References Cited in the file of this patent

UNITED STATES PATENTS

| | | |
|---|---|---|
| 1,668,984 | Simpson | May 8, 1928 |
| 1,908,087 | Walter | May 9, 1933 |
| 2,366,238 | Clausen | Jan. 2, 1945 |
| 2,428,924 | Albertson | Oct. 14, 1947 |
| 2,619,839 | Love | Dec. 2, 1952 |
| 2,704,941 | Holford | Mar. 29, 1955 |